United States Patent

[11] 3,543,666

[72] Inventor Sidney Kazel
 6131 N. Harding Ave., Chicago, Illinois 60645
[21] Appl. No. 726,847
[22] Filed May 6, 1968
[45] Patented Dec. 1, 1970

[54] AUTOMATIC RANGING AND FOCUSING SYSTEM
 5 Claims, 5 Drawing Figs.
[52] U.S. Cl. .................................................. 95/45, 356/4
[51] Int. Cl. .................................................. G03b 3/00
[50] Field of Search ...................................... 95/45, 44(C); 33/66; 356/4

[56] References Cited
UNITED STATES PATENTS
3,262,210  7/1966  Shapiro .......................... 33/46

Primary Examiner—John M. Horan
Assistant Examiner—Richard L. Moses

ABSTRACT: An automatic ranging and focusing system, for use with cameras and other similar optical systems, in which the range of an object of interest is automatically determined by measuring the convergence of the photographer's eyes. The computed range is used in focusing the camera on the object of interest. The principles of the present invention may also be used for purposes of automatic range finding.

3,543,666

AUTOMATIC RANGING AND FOCUSING SYSTEM

This invention relates to cameras and other optical systems and more particularly concerns a method of automatically focusing a camera or other optical system.

The term "camera" as used herein includes film and television cameras and in general any lens system which is required to focus an object onto a given image plane.

The term "photographer" as used herein denotes the user of a camera or other lens system which is required to focus an object onto a given image plane.

The terms "object distance" or "distance to the object" as used herein denote the distance to the object plane.

The term "image distance" as used herein denotes the distance to the image plane.

In the past, cameras with variable focus have required that the photographer manually adjust the focus. It often happens however that manual adjustment of the focus is too slow, with the result that the scene has changed before the correct focus is achieved, or that the photographer cannot keep in focus an object whose distance is changing.

It is an object of the present invention to provide a means of rapidly focusing a camera which is automatic and which, after a preliminary adjustment, requires no conscious act of focusing by the photographer other than to look at the object to be focused upon.

In accordance with the present invention, the distance to the object at which the photographer is looking is determined by automatically and continuously measuring the displacement of the photographer's eyes from their reference, or straight ahead, position. Means are provided to automatically adjust the focus of the camera to the correct setting corresponding to the object distance as thus determined.

Other objects and various additional features and advantages of the invention will become apparent from the following detailed description of illustrative embodiments thereof taken in conjunction with the attached drawings and the appended claims.

Figure 1:
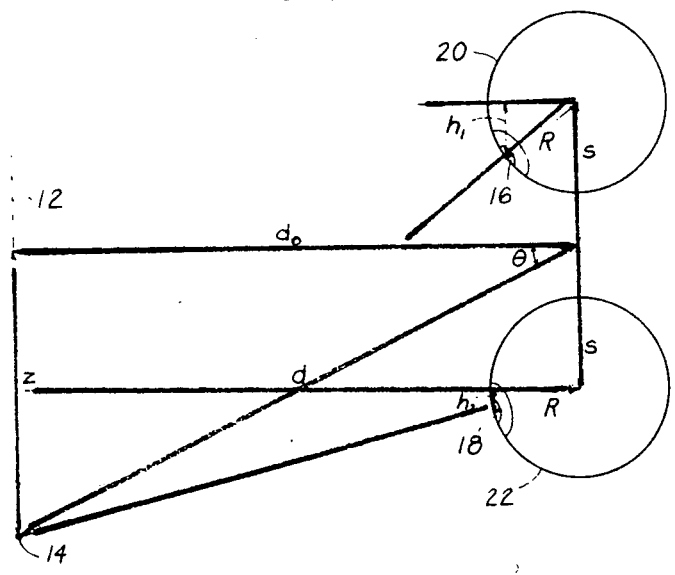
FIG. 1 shows the displacement of the pupils of the photographer's eyes when looking at an object.

Referring to FIG. 1, which shows the photographer's eyes in plan view, the present invention determines the distance $d_o$ to the plane 12 containing the object 14 to be brought into focus. $d_o$ is determined by measuring the displacements $h_1$ and $h_2$ of the pupils 16, 18 of the photographer's eyes 20, 22, respectively, from their reference, or straight ahead, positions. Denoting the difference $h_1-h_2$ as $\Delta h$, the following relationship holds:

$$\frac{\Delta h}{R} = \frac{h_1-h_2}{R} = \frac{z+s}{\sqrt{d_o^2+(z+s)^2}} - \frac{z-s}{\sqrt{d_o^2+(z-s)^2}} \quad (1)$$

where R is the radius of the eyeball, 2s is the reference interpupillary distance, and z is the off-axis distance of the object at which the photographer is looking. For $d_o$ much greater than $s$, which is the usual condition in photography, Equation (1) may be approximated by $$\Delta h/R \approx 2(s/d_o)\cos^3\theta \quad (2)$$

where $\theta$ is the angle which the line of sight to the object makes with the reference, or straight ahead direction, and is given by $$\theta = \cos^{-1} d_o/\sqrt{d_o^2+z^2} \quad (3)$$

Since the photographer will generally center the object of interest in the field of view, $\theta$ will be near zero, allowing $\cos^3\theta$ in Eq. (2) to be taken as unity with little error. Thus, Eq. (2) may be approximated as $$\Delta h/R = 2(s/d_o) \quad (4)$$

allowing the distance $d_o$ to be computed as $$d_o = 2sR/\Delta h \quad (5)$$

A more accurate value of $d_o$ can be obtained by using a more accurate value of $\cos^3\theta$ in Eq. (2). A useful relationship, for $\theta$ not too large, is $$\sin\theta \approx \frac{1}{2}(h_1+h_2)/R \quad (6)$$

allowing $\cos^3\theta$ to be calculated from $$\cos^3\theta = (1-\sin^2\theta)^{3/2} \quad (7)$$

Substituting the more accurate value of $\cos^3\theta$ obtained from Eq. (6) and Eq. (7) into Eq. (2), the distance $d_o$ to the object plane is $$d_o = \frac{2sR}{\Delta h}\left[1 - \frac{1}{4}\frac{(h_1+h_2)^2}{R^2}\right]^{3/2} \quad (8)$$

While $\Delta h$ is independent of a shift in the position of the photographer, $(h_1+h_2)$ is not. A notch 38 in the camera body is provided in which the photographer places the bridge of his nose, thereby fixing the coordinate system of his eyes relative to the camera. In an adjustment procedure prior to using the camera, a virtual, test image appearing to be at an infinite distance straight ahead is presented to the photographer by the present invention. As the photographer looks at the test image, the reference, or straight ahead, position of each eye is determined by a position-measuring device 58 in a manner described below. The reference positions for each eye are stored in the camera.

The interpupillary distance 2s is obtained as the spacing between the two reference positions. In subsequent use, the positions $h_1$ and $h_2$ of the photographer's eyes are measured relative to the stored reference positions. $\Delta h$, the change in the interpupillary distance, is equal to $h_1-h_2$.

To determine the eyeball radius R, the photographer manually focuses the camera on a nearby object centered in the field of view, obtaining $d_o$ from the calibration of the manual focus adjustment. R, from Eq. (5), is then obtained as $$R = d_o\Delta h/2s \quad (9)$$

using the value of $s$ previously established and the value $\Delta h$ measured by position-measuring device 58 when looking at said nearby object. Once determined for a given user, the values of R and $s$ may be set into the camera so that the adjustment procedure need not be repeated.

Figure 2:
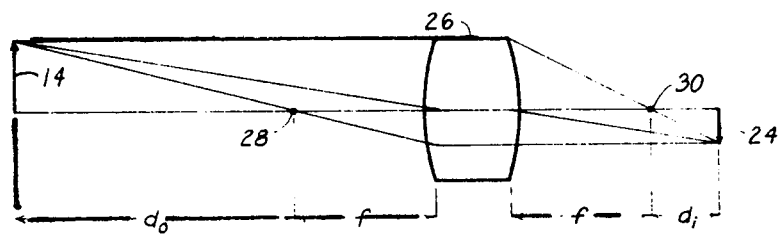
FIG. 2 shows the formation of an image by the lens of a camera.

Referring to FIG. 2, the distance $d_o$ to the object 14 and the distance $d_i$ to the image 24, as measured to the focal points 28, 30, of the camera lens 26, are related by the lens equation $$d_i/f = f/d_o \quad (10)$$

where $f$ is the focal length of the lens. The required focusing adjustment $d_i$ is seen from Eq. (10) to vary inversely as the object distance $d_o$. Since $\Delta h$, from Eq. (2), is also inversely proportional to $d_o$, it follows that the required focusing adjustment $d_i$ is proportional to the change $\Delta h$ in the interpupillary distance. Combining Eq. (2) and Eq. (10), the following proportional relationship between $d_i$ and $\Delta h$ is obtained:

$$d_i = K\Delta h \quad (11)$$

where $K = f^2/2Rs(\cos^3\theta)$.

Figure 3:
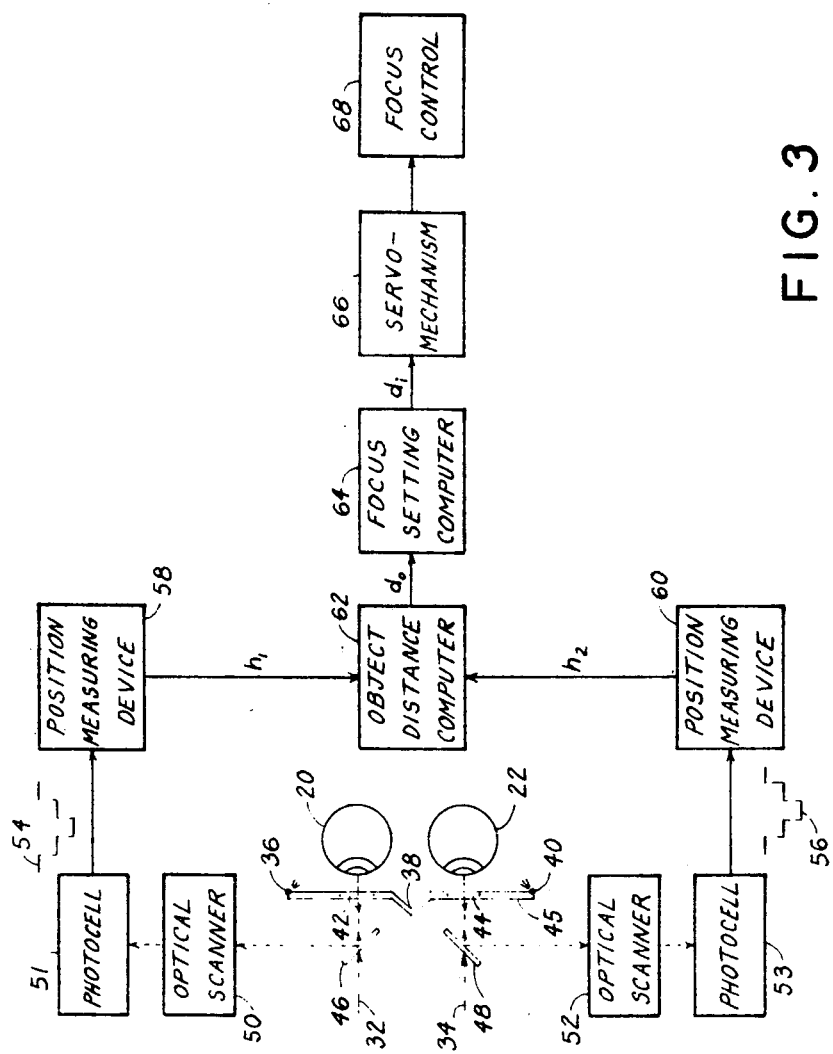
FIG. 3 is a combined view, partly schematic and partly in plan, of the automatic focusing portion of a camera in accordance with the present invention.

Referring to FIG. 3, the photographer places the bridge of his nose in a notch 38 in a shield 45 which causes his eyes to be located behind narrow horizontal slots 42, 44 in said shield. The purpose of the shield is to mask off all portions of the eyes except that behind the horizontal slots. The photographer's eyes 20, 22 are illuminated by light 32, 34 from the scene to be photographed and, if greater illumination is needed, by light sources 36, 40 attached to the camera. Light reflected from the photographer's eyes passes through slots 42, 44, is reflected by half-silvered mirrors 46, 48, is imaged onto image scanners 50, 52, and is detected by photocells 51, 53. The image scanners scan the image of each eye with a narrow vertical slit 74, and the photocells convert the light into electrical waveforms 54, 56. Position-measuring devices 58, 60 operate on the electrical waveforms to determine the displacements $h_1$ and $h_2$ of the photographer's eyes. The measured displacements $h_1$ and $h_2$ are put into the object distance computer 62 which computes the distance $d_o$ to the object plane according to the relationship of Eq. (5) or Eq. (8). The computed value of $d_o$ is put into the focus setting computer 64 which computes the image distance $d_i$ required for proper focus according to Eq. (10). The computed value of $d_i$ is applied to a servomechanism 66 or other proportional control device which mechanically adjusts the camera's focus control 68 to the proper image distance $d_i$.

Figure 4:
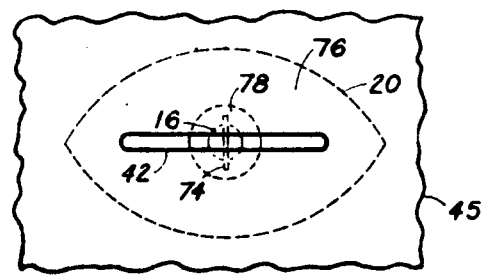
FIG. 4 shows the method used in the present invention for framing and scanning an image of the eye of the photographer for the purpose of locating its center.

Referring to FIG. 4, the framing and scanning of one of the photographer's eyes 20 is shown. To see the scene to be photographed, the pupil 16 of the photographer's eye is positioned behind a narrow horizontal slot 42. That portion of the eye behind the slot is imaged onto the image scanner 50 where it is scanned horizontally by a narrow vertical slit 74. The slot 42 is long enough so that the white of the eye 76, the iris 78, and the pupil 16 are all visible through the slot. The light passing through the scanning vertical slit 74 is converted into an electrical waveform 54 by a photocell 51.

Figure 5:
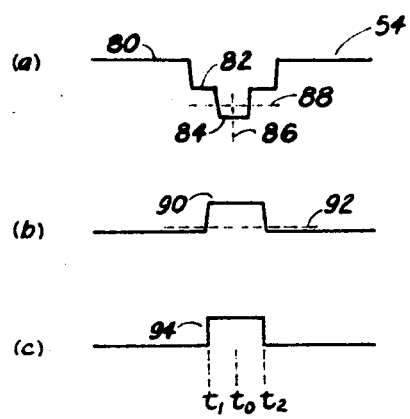
FIG. 5 shows the succession of waveform shaping operations which are used in the present invention to locate the center of each eye of the photographer.

FIG. 5 shows the electrical waveform 54 resulting from scanning the eye, and an exemplary sequence of wave-shaping operations performed by the position-measuring device 58 for the purpose of locating the center of the eye. The electrical waveform 54 out of the photocell is shown in FIG. 5a. It has three distinct levels: the highest level 80 is due to the reflectance of the white of the eye, the intermediate level 82 is due to the reflectance of the iris, and the lowest level 84 is due to the reflectance of the pupil. The waveform 54 is symmetrical about its center because of the symmetry of the eye. The center 86 of the waveform 54 corresponds to the time at which the center of the eye is scanned. The position-measuring device 58 locates the center 86 of waveform 54, thereby locating the center of the eye.

In the first step of processing the waveform 54 to locate its center, the portion of the waveform corresponding to the pupil of the eye is removed by clipping the waveform at a low level 88. The clipped waveform 90 is strongly limited at level 92 as shown in FIG. 5b. The limited and amplified waveform 94, shown in FIG. 5c, is essentially rectangular. The center $t_o$ of the rectangular waveform 94, corresponding to the center of the eye, is determined by averaging the instants of time $t_1$ and $t_2$ corresponding, respectively, to the rise and fall of the rectangular waveform 94, or $$t_o = \frac{1}{2}(t_1 + t_2) \quad (12)$$

Returning to FIG. 3, the displacements $h_1$ and $h_2$, as determined by position-measuring devices 58 and 62, are put into the object distance computer 62 which calculates the distance $d_o$ to the object according to either Eq. (5) or Eq. (8). The output $d_o$ of the object distance computer is put into the focus setting computer 64 which calculates the required image distance $d_i$ according to Eq. (10). If Eq. (5) is used to determine $d_o$, the relationship between $d_i$ and $\Delta h$ is one of direct proportionality, $d_i = K\Delta h$, as given by Eq. (11). In this case, the combined task of the object distance computer 62 and the focus setting computer 64 is simply to form the difference $\Delta h = h_1 - h_2$ and multiply it by a proportionality factor K. The image distance $d_i$ calculated by the focus setting computer 64 is applied to a servomechanism 66 or other equivalent means to position the focus control 68 of the camera to the position corresponding to the required image distance $d_i$.

The present invention, in its object distance measuring capacity, may also be used for purposes of automatic range finding.

Obviously many other modifications and variations of the present invention are possible in the light of the above teachings. It is therefore to be understood, that within the scope of the appended claims, the invention may be practiced otherwise than specifically described.

I claim:

1. In a camera and other optical systems of the adjustable focus type, the combination of measurement means to determine the displacement of the pupils of the photographer's eyes from their reference or straight ahead position, first computing means responsive to said measured displacements for determining the distance to the object at which the photographer is looking, second computing means responsive to said object distance for determining from the appropriate lens formula the image distance required to bring said object into focus, and control means for positioning the focus control of the camera to said computed image distance, whereby the object at which the photographer is looking is rapidly and automatically brought into focus with no manual action required of the photographer.

2. The system as defined in claim 1 wherein said first and second computing means are combined into a single computing means, said single computing means having the function of forming the difference $\Delta h$, the change in the interpupillary distance of the photographer's eyes, and multiplying it by a proportionality factor.

3. The system as defined in claim 1 wherein said measurement means for locating the center of each eye comprises, in combination, means for illuminating each eye, means for forming an image of each eye, horizontal slot means for framing a portion of the image of each eye containing the pupil, vertical slit means for scanning the portion of the image of each eye framed by said horizontal slot means, photoelectric means responsive to the light passing through said scanning vertical slit and producing an electrical output waveform in response thereto, and position-measuring means responsive to said electrical output waveform for locating the axis of symmetry of the waveform, whereby the center of each eye, corresponding to the axis of symmetry of said electrical output waveform, is located.

4. In a camera and other optical systems, the combination of measurement means to determine the displacement of the pupils of the photographer's eyes from their reference or straight ahead position and computing means responsive to said measured displacements for determining the distance to the object at which the photographer is looking, whereby the range to the object at which the photographer is looking is rapidly and automatically determined with no manual action required of the photographer.

5. The system as defined in claim 4 wherein said measurement means for locating the center of each eye comprises, in combination, means for illuminating each eye, means for forming an image of each eye, horizontal slot means for framing a portion of the image of each eye containing the pupil, vertical slit means for scanning the portion of the image of each eye framed by said horizontal slot means, photoelectric means responsive to the light passing through said scanning vertical slit and producing an electrical output waveform in response thereto, and position-measuring means responsive to said electrical output waveform for locating the axis of symmetry of the waveform, whereby the center of each eye, corresponding to the axis of symmetry of said electrical output waveform, is located.